United States Patent [19] [11] 4,038,481
Antrim et al. [45] July 26, 1977

[54] METHOD FOR TREATMENT OF CORN HULLS

[75] Inventors: Richard Lee Antrim, Clinton; Donald Wayne Harris, Camanche, both of Iowa

[73] Assignee: Standard Brands Incorporated, New York, N.Y.

[21] Appl. No.: 689,232

[22] Filed: May 24, 1976

[51] Int. Cl.$^2$ .................. C08B 1/00; C08B 37/14
[52] U.S. Cl. .................. 536/56; 127/37; 536/1; 536/114; 536/120
[58] Field of Search .................. 536/1, 114, 120, 56; 127/34, 37, 29

[56] References Cited

U.S. PATENT DOCUMENTS

| | | | |
|---|---|---|---|
| 1,819,233 | 8/1931 | Darling | 127/34 |
| 1,856,567 | 5/1932 | Kleinert et al. | 162/14 |
| 2,037,001 | 4/1936 | Aronovsky | 162/14 |
| 2,166,540 | 7/1939 | Bailey | 162/37 |
| 2,218,567 | 10/1940 | White | 536/1 |
| 2,526,607 | 10/1950 | Kurth | 127/37 |
| 2,615,883 | 10/1952 | Sweeney et al. | 127/37 |
| 2,709,699 | 5/1955 | Wolf et al. | 536/1 |
| 2,801,955 | 8/1957 | Rutenberg et al. | 127/37 |
| 2,868,778 | 1/1959 | Watson et al. | 536/114 |
| 3,579,380 | 5/1971 | Friese | 127/37 |
| 3,716,526 | 2/1973 | Schweiger | 536/114 |
| 3,879,373 | 4/1975 | Gerrish et al. | 536/1 |

FOREIGN PATENT DOCUMENTS

| | | | |
|---|---|---|---|
| 2,358,472 | 5/1975 | Germany | 536/1 |
| 2,365,457 | 5/1975 | Germany | 536/1 |

OTHER PUBLICATIONS

"Chemical Examination of Corn Bran"—Hooper, *Industrial and Engineering Chemistry*, June 1942, pp. 728–729.
"Organosolv Pulping with Aqueous Alcohol"—Kleinert, *Tappi*, vol. 57, No. 8, Aug. 1974, pp. 99–102.

*Primary Examiner*—Ronald W. Griffin

[57] ABSTRACT

Corn hulls are subjected to a treatment to obtain three fractions therefrom comprising a cellulosic fraction, a hemicellulose fraction and a noncarbohydrate fraction. The noncarbohydrate fraction is characterized as being an organic solvent extract comprising at least about 15 percent of the dry weight of the corn hulls and containing above about 10 percent by weight ferulic acid.

10 Claims, No Drawings

METHOD FOR TREATMENT OF CORN HULLS

BACKGROUND OF THE INVENTION

1. Field of the Invention

This invention relates to the treatment of corn hulls. More particularly, this invention relates to the treatment of corn hulls to obtain three fractions therefrom.

2. Description of the Prior Art

Many processes are known in the art for obtaining various fractions from plant materials. For example, wood chips may be treated to obtain cellulose having various degrees of purity. Typically, wood pulping processes involve treatments at high temperatures under highly alkaline or acid conditions and may include the use of certain chlorine and sulfur compounds to assist in the solubilization of lignin. The liquor resulting from such treatments may comprise mixtures of lignins, hemicellulose, various sugars and degradation products. Efforts have been made to recover various components of the liquor but such have not proven entirely satisfactory due, principally, to the large amounts of degradation products present.

One approach which has been taken to minimize the formation of degradation products is the utilization of alcohols for removal of lignins in the pulping process. U.S. Pat. 1,856,567 to Kleinert et al. and U.S. Pat. No. 2,037,001 to Aronovsky disclose various procedures for the alcoholic extraction of wood pulp. U.S. Pat. No. 2,166,540 to Bailey teaches the treatment of lignified cellulosic material with an aqueous alkaline solution of alcohol. Pulping using aqueous ethanol at high temperatures is described by T. N. Kelinert in *Tappi, Vol.* 57, No. 8, August 1974.

There are a number of procedures disclosed in the art directed to the extraction of hemicellulose from fibrous waste products such as corn hulls, cotton seed hulls, peanut hulls, oat hulls and the like utilizing aqueous alkali. Exemplary of such procedures are those disclosed in U.S. Pat. No. 1,819,233 to Darling; U.S. Pat. No. 2,218,567 to White; U.S. Pat. No. 2,709,699 to Wolf et al.; U.S. Pat. No. 2,801,955 to Rutenberg et al.; U.S. Pat. No. 2,868,778 to Watson et al.; and U.S. Pat. No. 3,879,373 to Gerrish et al. These procedures generally suffer the disadvantage of producing a colored, impure, hemicellulose product. German Offenlegungsschrift Nos. 2,358,472 and 2,365,457 disclose processes for treating oat hulls to recover xylose, cellulose and lignin.

U.S. Pat. No. 3,716,526 to Schweiger teaches a method for producing a relatively pure hemicellulose product whereby corn hulls are first subjected to an alkaline extraction procedure to produce a crude hemicellulose product and then treating such product with an aqueous organic acid containing liquid to solubilize the impurities.

OBJECTS

It is the principal object of the present invention to provide a process for treating corn hulls to provide relatively pure fractions therefrom.

It is a further object to provide a process for treating corn hulls to obtain three fractions therefrom comprising a cellulosic fraction, a hemicellulose fraction and a noncarbohydrate fraction.

Other objects and advantages will be apparent from the specification and the appended claims.

SUMMARY OF THE INVENTION

Corn hulls are treated to obtain a cellulose fraction, a hemicellulose fraction and a noncarbohydrate fraction. The hulls are first treated with a sufficient amount of alkali to hydrolyze the hulls to effect liberation of the hemicellulose fraction so that it may be solubilized in water and to solubilize the noncarbohydrate fraction. A water solution of the hemicellulose, an organic solvent extract of the noncarbohydrate fraction and an insoluble residue comprising the cellulose fraction are recovered.

DETAILED DESCRIPTION OF THE INVENTION

Corn hulls from a wet milling operation contain relatively large amounts of impurities in admixture with the fibrous, relatively large corn hull fraction. These impurities are in the form of "fine material" and contain the predominant amount of non-fibrous substances, such as starch, protein, oil containing material, lignified tip cap, etc. Initial separation of such from the corn hulls will result in increased purity of the cellulose, the hemicellulose and the noncarbohydrate fractions. Separation may be accomplished by any convenient method, for instance, by screening through a screen of No. 6 U.S. Standard mesh. The particle size range of the corn hulls containing the predominant amount of impurities may vary, of course, depending upon the particular manner in which the corn hulls are treated and handled during the milling operation. Residual starch which may be present in the corn hulls after the screening operation can be removed by an enzymatic solubilization treatment, for instance with alpha-amylase.

The relatively purified corn hulls may next be subjected to an alkaline hydrolysis treatment using sufficient alkali to cause hydrolysis of the corn hulls to effect liberation of the hemicellulose fraction so that it may be solubilized in water. The noncarbohydrate fraction is solubilized during this treatment. Alkalies suitable for this purpose include the alkali metal hydroxides and the alkaline earth metal hydroxides. The temperatures at which the hydrolysis may be carried out may vary over a wide range but it is contemplated that it will be performed at temperatures of from about ambient to about 140° C and preferably from about ambient to about 100° C.

Three approaches may be utilized to obtain the fractions of corn hulls enumerated above. In the first approach, the alkaline hydrolysis is performed using an aqueous system wherein the hemicellulose and the noncarbohydrate fractions are solubilized leaving behind the insoluble cellulose fraction. Then, a sufficient amount of a water miscible organic solvent is added to the alkaline solution to precipitate the hemicellulose. Exemplary of water-miscible organic solvents which may be utilized are acetone methanol, ethanol, propanol, isopropanol, secondary butyl alcohol, tertiary butyl alcohol, mixtures thereof, etc. The solvent supernate contains the noncarbohydrate fraction and this fraction may be recovered by any convenient means, for instance, by evaporating the solvent.

In the second approach, the hydrolysis is performed using an alkaline water-miscible organic solvent system. Sufficient water should be present to solubilize the alkali and the noncarbohydrate fraction, but insufficient to solubilize appreciable quantities of the hemicellulose. The amount of water which may be tolerated is dependent upon a number of factors such as the particular solvent utilized, temperature of treatment and the like. In the case when the solvent is ethanol, substantial quantities of hemicellulose will be solubilized if the amount of water exceeds about 40 percent. In general, however, the extraction solution will comprise from about 60 to about 90 percent solvent and the remainder water. This extraction solution will contain the noncarbohydrate fraction and may be recovered therefrom in the manner indicated above. The residue from the extraction treatment will comprise the hemicellulose and cellulose fractions. These fractions may be separated by solubilization of the hemicellulose in water and removing the cellulose by filtration, centrifugation or the like. The solubilized hemicellulose may be recovered from solution by a number of techniques such as by adding alcohol to the solution to precipitate the hemicellulose or by evaporation of the solution to dryness.

In the third approach, the corn hulls are subjected to an alkaline hydrolysis treatment under conditions similar to those described for the first approach above, except that minimal water, for instance, an amount not exceeding about 65 percent based on the weight of the corn hulls and preferably from about 25 to about 55 percent on the same weight basis, is utilized so that the hemicellulose fraction does not migrate from the corn hull structure. Next the treated corn hulls are contacted with a water-miscible organic solvent to extract the noncarbohydrate fraction. The residue from the extraction treatment will comprise the hemicellulose and cellulose fractions which may be separated and recovered by the procedures described above.

While the approaches described above involve different sequences of treatments steps, they are similar in many respects. For example, in the alkaline hydrolysis step, sufficient alkali must be present so that the product fractions can be concurrently or subsequently separated by solvent extraction. When NaOH is used, the amount of alkali required is usually from about 5 to about 15% based on dry hull weight. Additionally, in the extraction of the noncarbohydrate fraction, conditions should be maintained such that the total amount extracted is at least 15 percent of the dry weight of the untreated corn hulls and contains above about 10 percent ferulic acid. Preferably, conditions should be utilized such that the total amount of noncarbohydrate fraction extracted is above 20 percent and the ferulic acid content of the extracted noncarbohydrate fraction is from about 10% to about 20% on the same weight basis.

While separation of the major proportion of the noncarbohydrate fraction with an organic solvent can be performed under a variety of conditions, it is preferred that the separation be performed at least once with an aqueous organic solvent system having a pH below about 4 and more preferably having a pH in the range of 2 to 3. This will ensure substantially complete removal of the noncarbohydrate fraction. The conditions under which the present process is performed may vary as indicated above, but the conditions should be maintained to obtain the amounts of the three fractions indicated below in Table I.

TABLE I

| | Fractions (% by weight (ash free d.b.) based on dry weight of corn hulls | | |
|---|---|---|---|
| | Cellulose | Hemicellulose | Noncarbohydrate |
| Typical Range | 20–40 | 35–55 | above about 15 |

TABLE I-continued

| | Fractions (% by weight (ash free d.b.) based on dry weight of corn hulls | | |
|---|---|---|---|
| | Cellulose | Hemicellulose | Noncarbohydrate |
| Preferred Range | 29–35 | 36–43 | 20–25 |

Separation of corn hulls into the three fractions enumerated above in accordance with the present method is quite surprising. Hooper, Journal Paper J-990 of the Iowa Agricultural Experimental Station, Industrial and Engineering Chemistry, p. 728, June 1942, reported that corn hulls contain 3.84–4.97 percent protein, 0.76–0.92 percent oil, 0.79–1.10 percent ash, and 93.24–94.36 percent carbohydrate, no mention being made of a noncarbohydrate fraction.

Water soluble hemicellulose, which may be used as a food thickener and in other applications, is relatively expensive. The present method makes possible an efficient and economical method of producing hemicellulose of a high degree of purity.

In the noncarbohydrate fraction, relatively large quantities of ferulic acid and possibly ferulic acid precursors are present. Ferulic acid may be used as an intermediate in the production of vanillin and as a means of controlling discoloration during processing of fruits and vegetables.

While the three fractions produced by the present process are specifically referred to herein, it should be understood while the hemicellulose and noncarbohydrate fractions are relatively pure, the cellulose fraction may contain a large proportion of insoluble hemicellulose, i.e., up to 35 percent by weight.

In order to more clearly describe the nature of the present invention, specific examples will hereinafter be described. It should be understood, however, that this is done solely by way of example, and is intended neither to delineate the scope of the invention nor limit the ambit of the appended claims.

EXAMPLE 1

This example illustrates the separation of corn hulls into three fractions by an alkaline hydrolysis technique using a watermiscible organic solvent system.

Corn hulls from a corn wet milling operation were wet screened through a U.S. No. 6 screen at about 50° C using sufficient water to substantially remove the fine fiber, most of the starch and some of the protein and lipid material present. The hulls remaining on the screen were then slurried in water and the pH of the slurry adjusted with lime to pH 6.5 and treated at 79° C for 1 hour with a B. subtilis alpha-amylase at a dosage of about 3 liquefons/g of hull solids. The hulls were filtered, washed and dried to a moisture range of 5 to 10 percent in a forced air oven at 70°C.

Fifty-two grams (50.6 g d.b.) of the hulls were slurried in 1000 ml of 69 percent aqueous ethanol (v/v) containing 5 g of reagent grade NaOH and the slurry heated in a Parr model 4522 pressure reactor at 100° C for 3 hours. The reaction mixture, at a temperature of about 50° C, was then filtered through a Buchner funnel using Whatman No. 3 filter paper.

The filter cake was then extracted by refluxing at about 82° C with 1000 ml of 69 percent aqueous ethanol (v/v) for one hour and the mixture filtered at a temperature of about 50° C through a Buchner funnel using Whatman No. 3 paper. The filter cake was next slurried in 1000 ml of 69 percent aqueous ethanol (v/v) and the slurry adjusted with diluted HCl to pH2 and filtered as above. The filtrate was combined with the filtrates from the two previous filtrations, the combined filtrates adjusted to pH 2 with HCl, evaporated to dryness and the residue dried in a vacuum oven at 70° C. This product was the noncarbohydrate fraction.

To extract the hemicellulose, the filter cake from the above procedure was slurried in 1000 ml of deionized water, held at room temperature for about two hours, and filtered through a coarse sintered glass funnel. This procedure was repeated a second time. The filtrates from these two extractions were combined and concentrated to about 10 percent solids by evaporation of the water on a vacuum rotary evaporator at a temperature of 40° C and a vacuum of about 20 inches of mercury. The concentrated hemicellulose solution was then dried on a drum drier having a surface temperature of 130° C, and the dried hemicellulose ground in a Waring blender.

The cellulose residue, filter cake from the hemicellulose extraction, was wet screened through a U.S. No. 30 mesh screen and collected on a U.S. No. 70 mesh screen. This removed extraneous materials such as tip caps and hull material of the corn hulls that were not defiberized in the alkali digestion. The cellulose rich residue was dewatered by filtration and drum-dried to give a light tan colored cellulose product. The yields of the various fractions are set forth in Table II.

TABLE II
YIELD OF FRACTIONS

| Fraction | Yield (%) (Ash-Free, Dry Basis) |
| --- | --- |
| Noncarbohydrate Fraction | 21.5 |
| Hemicellulose Fraction | 36.1 |
| Cellulose Fraction | 28.8 |
| Other (extraneous materials) | 6.3 |
| Total | 92.7* |

*Remainder of material was presumably volatilized during drying of noncarbohydrate fraction

EXAMPLE II

This example illustrates the separation of corn hulls into three fractions wherein the hulls are first subjected to a treatment with aqueous alkali.

Corn hulls from a corn wet milling operation were placed on a U.S. No. 6 screen and sprayed with sufficient water at a temperature of 50° C to remove the fine fiber, most of the starch and some proteinaceous and lipid material. The corn hulls retained on the screen were slurried in water at a solids concentration of 10 percent, the pH was adjusted with lime to approximately 6.5, and a sufficient amount of alpha-amylase (Novo Termamyl-60) was added to the slurry to obtain therein a dosage of about 3 liq/g of corn hull solids. The slurry was held at a temperature of about 80° C until the achroic point was reached, boiled for 15 to 20 minutes and was placed on a U.S. No. 6 screen and rinsed with water. The material retained on the screen was vacuum filtered to remove excess water.

The filter cake (clean corn hulls) was slurried in a stainless steel container with sufficient water and NaOH to provide a level of 8 and 12 percent, respectively, based upon the weight of the solids present. The container was heated at 100° C for three hours and then the slurry was filtered on a Buchner funnel using cloth filters. The resulting filtrate was again filtered through a glass disc to remove any cellulose fines which might be present.

The resulting cellulose filter cake was slurried in water at about 50° C and a solids level of 8 percent, the slurry filtered, and the filter cake washed. This procedure was repeated for a total of six times and the filtrates combined with the previous filtrate from the alkaline hydrolysis treatment.

The washed cellulose filter cake was screened to remove extraneous materials such as tip cans, germ particles and any other foreign particles. The resulting product was dried in a forced air oven at a temperature of 65° C to a moisture content of 5 to 10 percent.

The combined filtrates containing the hemicellulose and noncarbohydrate fractions was concentrated to 10 to 15 percent solids level on a rotary evaporator under the same condition as in Example I. The pH was then lowered to about 2 with 6N HCl. 2.5 volumes of 95% ethyl alcohol, based on the volume of the concentrate, was added to the concentrate while stirring. The insoluble precipitate comprising the hemicellulose was allowed to settle and the supernate was decanted. The isolated hemicellulose was washed with 3A ethyl alcohol and air dried. The supernate was adjusted to a pH of 7 by the addition of dilute sodium hydroxide, stripped to dryness on a rotary evaporator, and dried in a vacuum oven at 70° C.

The yield of the various fractions are set forth in Table III.

TABLE III
YIELD OF FRACTIONS

| Fraction | Yield (%) (Ash-Free, Dry Basis) |
| --- | --- |
| Noncarbohydrate Fraction | 21.1 |
| Hemicellulose Fraction | 40.8 |
| Cellulose Fraction | 32.9 |
| Other (extraneous materials) | 2.2 |
| Total | 95.0* |

*Remainder of material was presumably volatilized during drying of noncarbohydrate fraction.

EXAMPLE III

This example illustrates a method for the separation of corn hulls into three fractions wherein the hulls are first subjected to an alkaline-water treatment, utilizing minimum amounts of water so that the hemicellulose fraction does not migrate from the corn hull structure.

Corn hulls were destarched as in Example II and dried to about 5 percent moisture in a forced air oven at 70° C. A mixture of 22.8 ml water and 5 g NaOH was added to 50 g of the dried hulls and the slurry stirred, placed in a container which was sealed and heated at about 90° C for six hours in a hot water bath. The container was then removed from the hot water bath and 500 ml of 95 percent ethyl alcohol and 100 ml of water were added. The pH of the slurry was adjusted to about 2.5 with about 23 ml of 6N HCl, and the slurry stirred for about 1 hour at room temperature and filtered. The residue was reslurried in about 500 ml of 95 percent ethyl alcohol and 100 ml of water (pH 2.5, no adjustment) with stirring ring for about sixteen hours at room temperature and the slurry filtered. The filtrate was combined with the filtrate from the previous filtration, evaporated on a vacuum rotary evaporator under the same conditions as in Example I, and dried in a vacuum dessicator over KOH to obtain the noncarbohydrate fraction.

The residue from the extraction was slurried in 500 ml of water and sufficient NaOH added to adjust the pH to about 4.5. The slurry was then stirred for about 4 hours, boiled for about five minutes and filtered through glass. The filter cake was reslurried in about 300 ml of water and the slurry heated to about 70+ C and filtered. The filter cake was again reslurried as immediately above. The filtrates were combined and evaporated to about 500 ml and about 2.5 volumes of 95 percent ethyl alcohol was added to percipitate the hemicellulose. The alcoholic filtrates were filtered to separate the hemicellulose which was washed with additional ethyl alcohol and dried.

The filter cake from the hemicellulose extraction containing the cellulose residue was dehydrated with 95 percent ethyl alcohol and oven dried.

The yield of the three fractions obtained is shown in Table IV below:

TABLE IV

YIELD OF FRACTIONS

| Fraction | Yield (%) (Ash-Free, Dry Basis) |
|---|---|
| Noncarbohydrate Fraction | 21.6 |
| Hemicellulose Fraction | 42.7 |
| Cellulose Fraction | 34.8 |
| Total | 99.1* |

*Remainder of material was presumably volatilized during drying of noncarbohydrate fraction.

EXAMPLE IV

This example illustrates the utilization of the process of the present invention to separate fractions of a variety of agriculture materials.

The products utilized in this example were analyzed for certain constituents and the results are set forth below in Table V.

The extracts were heated to 100° C and maintained at that temperature for three hours, cooled to about 70° C and filtered through either a medium porosity sintered glass funnel or a Buchner funnel using Whatman No. 3 filter paper. The filtrates were adjusted to pH 2.5 using dilute HCl, evaporated using a Brinkman rotary evaporator and finally dried in a vacuum oven at 70° C overnight. The yields of filtrate solids are enumerated under the heading "alkaline filtrate" in Table VI.

To each insoluble residue derived above was added 500 ml of 69 percent ethanol (v/v) and the mixture refluxed at about 82° C for one hour in a one liter resin pot with stirring. The mixture was filtered, the filtrate adjusted to pH 2.5 and evaporated to dryness using a rotary evaporator and the residue dried for about 18 hours in a vacuum oven. This material is designated as "1st alkaline extract" in Table VI.

Each insoluble residue was alcohol extracted a second time, and dried using the same procedure described immediately above. This material is designated as "2nd alkaline extract" in Table VI.

Each insoluble residue was suspended in 500 ml of 69 percent aqueous ethanol and the pH adjusted to 2.5 using dilute HCl. The mixture was warmed to about 60° C, stirred 1 hour, and filtered. The filtrate was evaporated using a rotary evaporator and was finally dried in the vacuum oven at 70° C for about 18 hours. This material is designated as "acid extract" in Table VI.

Each insoluble residue was then slurried with two successive 500 ml portions of deionized water at about 40° C to extract soluble hemicellulose. The two combined hemicellulose filtrates were reduced in volume to about 100 ml using a rotary evaporator, and then treated with three volumes of ethanol to precipitate hemicellulose. The supernate was removed by filtration and the

TABLE V

| Analysis of Constituents of Starting Agricultural Products (Percent, Dry Basis) | | | | | | |
|---|---|---|---|---|---|---|
| Material Analyzed | Moisture | Protein | Starch | Fat (Hexane Soluble) | Fat (Alcohol/Benzene Soluble) | Ash (Non-Sulfated) |
| Ground Corn Cobs | 6.01 | 2.13 | 0 | 0.28 | 2.28 | 1.02 |
| Rice Hulls | 10.43 | 2.95 | 0 | 1.02 | 3.85 | 21.84 |
| Peanut Shells | 7.67 | 12.69 | 2.14 | 7.13 | 12.17 | 27.50 |
| Cottonseed Hulls | 10.79 | 5.03 | 4.10 | 2.34 | 4.24 | 2.24 |
| Wheat Table Bran | 8.31 | 19.04 | 12.76 | 4.39 | 9.19 | 6.69 |
| Oat Hulls | 7.18 | 2.86 | 2.70 | 0.88 | 3.46 | 6.83 |
| Solvent Extracted Aspen* | 7.37 | 0.69 | 0 | 0.45 | 1.55 | 0.43 |
| Ground Wheat Straw | 6.96 | 3.22 | 2.39 | — | 4.56 | — |
| Solvent Extracted Sitka Spruce** | 7.20 | 0.52 | 0 | 0.58 | 2.69 | 0.21 |
| Destarched Corn Hulls (Typical) | — | 4 | 0 | 1 | 2 | 1 |

*Sample as received was extracted with ethanol-water (9:1) and was in the form of small chips.
**Sample as received was extracted with acetone-water and benzene-ethanol and was in the form of a fine meal.

The fraction separation of each agricultural material was carried out by adding 50 g, dry basis, of the material to an alcoholic sodium hydroxide solution (5 g NaOH pellets dissolved in 1000 ml of 69% (v/v) ethanol) in a Parr model 4522 pressure reactor.

hemicellulose filter cake was washed with additional alcohol and then oven dried. This material is designated as "hemicellulose fraction" in Table VI.

Each insoluble cellulosic residue from the aqueous hemicelluextractions was dehydrated with ethanol and oven dried at 105° C under vacuum. This material is designated as "cellulose fraction" in Table VI.

TABLE VI

| | YIELD OF FRACTIONS (GRAMS, DRY BASIS) | | | | | | |
|---|---|---|---|---|---|---|---|
| | | Noncarbohydrate Fraction | | | | | |
| Starting Material | Starting Weight | Alkaline Filtrate | 1st Alkaline Extract | 2nd Alkaline Extract | Acid Extract | Hemicellulose | Cellulose |
| Ground Corn Cobs | 47.00 | 13.15 | 1.96 | 0.90 | 0.85 | 0.86 | 32.85 |
| Rice Hulls | 44.79 | 7.43 | 1.07 | 0.42 | 2.04 | 0.43 | 33.71 |
| Peanut Shells | 46.17 | 18.55 | 1.80 | 0.56 | 2.02 | 0.50 | 24.76 |
| Cottonseed Hulls | 44.61 | 8.49 | 1.29 | 0.58 | 2.11 | 0.50 | 36.13 |
| Wheat Table Bran | 45.85 | 20.13 | 2.84 | 1.07 | 3.56 | 6.07 | 11.15 |
| Oat Hulls | 46.53 | 11.92 | 1.82 | 0.86 | 1.26 | 2.30 | 27.61 |
| Solvent Extracted Aspen | 46.32 | 12.43 | 1.27 | 0.47 | 0.95 | 0.37 | 36.86 |
| Ground Wheat Straw | 14.10* | 4.13 | 0.77 | 0.31 | 0.60 | 0.45 | 8.80 |

TABLE VI-continued

| | YIELD OF FRACTIONS (GRAMS, DRY BASIS) | | | | | | |
|---|---|---|---|---|---|---|---|
| | | Noncarbohydrate Fraction | | | | | |
| Starting Material | Starting Weight | Alkaline Filtrate | 1st Alkaline Extract | 2nd Alkaline Extract | Acid Extract | Hemicellulose | Cellulose |
| Solvent Extracted Sitka Spruce | 15.00* | 3.54 | 0.39 | 0.04 | 0.51 | 0.14 | 11.69 |

*Proportions of reactants utilized were reduced by ⅓ because of starting weight of material The data show that in all cases, most of the noncarbohydrate fraction was extracted in the initial alkaline hydrolysis treatment.

All of the noncarbohydrate fractions in Table VI were combined, corrected for salt content and the amount of said fraction calculated as a percentage of the starting material on a dry basis. The "hemicellulose fraction" and "cellulose fraction" were also calculated on a percentage basis of the starting material. It was assumed that all of the salt formed during processing was contained in the noncarbohydrate fraction. These data are set forth in Table VII.

TABLE VII

YIELD OF FRACTIONS (PERCENT, DRY BASIS)

| Material Treated | Noncarbohydrate Fraction* | Hemicellulose Fraction | Cellulose Fraction |
|---|---|---|---|
| Ground Corn Cobs | 20.3 | 1.83 | 69.9 |
| Rice Hulls | 8.5 | 0.96 | 75.3 |
| Peanut Shells | 33.8 | 1.08 | 53.6 |
| Cottonseed Hulls | 11.6 | 1.12 | 81.0 |
| Wheat Table Bran | 44.3 | 13.20 | 24.3 |
| Oat Hulls | 18.4 | 4.94 | 59.3 |
| Solvent Extracted Aspen | 16.9 | 0.80 | 79.6 |
| Ground Wheat Straw | 25.7 | 3.19 | 62.4 |
| Solvent Extracted Sitka Spruce | 15.3 | 0.93 | 77.9 |

*Corrected for salt content based upon amounts of NaOH and HCl utilized

From Table VII it is seen that when various agricultural products were treated in accordance with the present invention, the percentage of hemicellulose obtained was quite low as compared to the amount of hemicellulose obtained from corn hulls.

The lignin content of woods can be approximated by methoxyl analysis, as most of the methoxyl content of wood is due to the presence of lignin. The methoxyl content of the starting materials and of the cellulose fraction separated therefrom was determined in order to approximate the degree of lignin removal obtained by the process of the present invention. The results are set forth in Table VIII.

TABLE VIII

Methoxyl Content of Various Agricultural Products And By-Products and of the Cellulose Fractions Therefrom (Percent, Dry Basis)

| Substance | Starting Material | "Cellulose Fraction" |
|---|---|---|
| Ground Corn Cobs | 2.62 | 0.64 |
| Rice Hulls | 2.67 | 2.10 |
| Peanut Shells | 2.99 | 3.56 |
| Cottonseed Hulls | 1.61 | 1.53 |
| Wheat Table Bran | 0.87 | 0.65 |
| Oat Hulls | 2.65 | 1.23 |
| Solvent Extracted Aspen | 5.28 | 4.53 |
| Ground Wheat Straw | 3.62 | — |
| Solvent Extracted Sitka Spruce | 4.58 | 5.00 |
| Destarched Corn Hulls (Typical) | 1.50 | 0.30 |

The methoxyl content of the cellulose fractions separated from corn cobs, wheat bran, and oat hulls indicate the presence of a relatively low amount of lignin or lignin-like material. However, in every case, the methoxyl content was greater than the methoxyl content of cellulose separated from corn hulls using the process of the present invention.

In summary, this example demonstrates that corn hulls are unique in the amounts of water soluble hemicellulose and cellulose containing a very low methoxyl content that are separated by the process of the invention.

What is claimed is:

1. A method for treating corn hulls to obtain a cellulose fraction, a hemicellulose fraction and a noncarbohydrate fraction comprising treating corn hulls with a sufficient amount of alkali to hydrolyze the corn hulls to affect liberation of the hemicellulose fraction so that it may be solubilized in water and to solubilize the noncarbohydrate fraction, recovering a hemicellulose fraction, an organic solvent extract of the noncarbohydrate fraction and an insoluble residue comprising the cellulose fraction.

2. A method for treating corn hulls as defined in claim 1, wherein the treatment is performed under conditions to obtain an amount of the noncarbohydrate fraction comprising at least about 15 percent by weight of the dry weight of the corn hulls, said fraction containing above about 10 percent by weight ferulic acid.

3. A method for treating corn hulls as defined in claim 2, wherein the treatment is performed under conditions to obtain an amount of the noncarbohydrate fraction comprising at from about 20 percent to 30 percent by weight of the dry weight of the corn hulls, said fraction containing from about 10 to about 20 percent by weight ferulic acid.

4. A method for treating corn hulls as defined in claim 2, wherein the corn hulls are subjected to an aqueous alkaline hydrolysis treatment to solubilize the noncarbohydrate and hemicellulose fractions, contacting the resulting solution with a sufficient amount of a water miscible organic solvent to precipitate the hemicellulose and recovering the noncarbohydrate fraction from the organic solvent.

5. A method for treating corn hulls as defined in claim 2, wherein the corn hulls are subjected to an alkaline hydrolysis treatment to dissolve the noncarbohydrate fraction and to liberate the hemicellulose fraction so that it may be solubilized water, contacting the alkaline hydrolysis reaction product with a water miscible organic solvent to extract the noncarbohydrate fraction and treating the insoluble residue with water to separate the hemicellulose fraction from the cellulose fraction.

6. A method for treating corn hulls as defined in claim 2, wherein the corn hulls are contacted with an alkaline aqueous-miscible organic solvent system which contains insufficient water to substantially solubilize the hemicellulose fraction and thereby extracting the noncarbohydrate fraction and treating the insoluble residue with water to separate the hemicellulose fraction from the cellulose fraction.

7. A method for treating corn hulls as defined in claim 6, wherein the alkaline hydrolysis treatment is performed at a temperature of from about ambient to about 140° C.

8. A method for treating corn hulls as defined in claim 7, wherein the alkaline hydrolysis treatment is performed at a temperature of from about ambient to about 100° C.

9. A method for treating corn hulls as defined in claim 6, wherein the resulting solution is contacted with a water miscible solvent having a pH below about 4.

10. A method for treating corn hulls as defined in claim 9, wherein the alkaline aqueous miscible organic solvent containing solubilized noncarbohydrate fraction has a pH below about 3.

* * * * *

UNITED STATES PATENT AND TRADEMARK OFFICE
CERTIFICATE OF CORRECTION

PATENT NO. : 4,038,481
DATED : July 26, 1977
INVENTOR(S) : Richard L. Antrim et al.

It is certified that error appears in the above-identified patent and that said Letters Patent are hereby corrected as shown below:

Column 1

Line 27; "Kelinert" should read --Kleinert--.

Column 3

Line 23; a space should appear between "about" and "65".

Line 65; closing parenthesis should appear after "hulls".

Column 4

Line 3; closing parenthesis should appear after "hulls".

Lines 12 to 13; "Industrial and Engineering Chemistry" should be italicized.

Line 45; a hyphen should appear between "water" and "miscible".

Column 5

Line 2; a space should appear between "pH" and "2".

UNITED STATES PATENT AND TRADEMARK OFFICE
CERTIFICATE OF CORRECTION

PATENT NO. : 4,038,481
DATED : July 26, 1977
INVENTOR(S) : Richard L. Antrim et al.

It is certified that error appears in the above-identified patent and that said Letters Patent are hereby corrected as shown below:

Column 6

Line 10; "cans" should read --caps--.

Line 62; "ring" should be deleted.

Column 7

Line 6; "70+" should read --70°--.

Line 32; "agriculture" should read --agricultural--.

Column 10

Line 54; after "solubilized" insert --in--.

Signed and Sealed this

Fourteenth Day of March 1978

[SEAL]

Attest:

RUTH C. MASON
Attesting Officer

LUTRELLE F. PARKER
Acting Commissioner of Patents and Trademarks